United States Defensive Publication [19] (H) [11] T965,001

Carbone et al. [43] Dec. 6, 1977

[54] DYESTUFF WASTE WATER PURIFICATION

[76] Inventors: John N. Carbone, 3416 Winchester Drive; George S. Dominguez, 904 Chatfield Drive; Jayanti V. Isharani, 803 Coronado Drive, all of Greensboro, N.C. 27410

[21] Appl. No.: 768,915

[22] Filed: Feb. 15, 1977

Related U.S. Application Data

[63] Continuation of Ser. No. 600,534, July 31, 1975, abandoned.

[51] Int. Cl.[2] ..... C02B 1/20

[52] U.S. Cl. ..... 210/52; 210/54; 210/96 R

[57] ABSTRACT

This invention relates to the purification and clarification of a dyestuff and pigment colored waste water by contacting said waste water with an effective amount of a condensation product of formaldehyde and dicyandiamide, and an electrolyte, to coagulate said dyestuff, and removing the resultant coagulate from the waste water.

7 Claims, 1 Sheet Drawing,

19 Pages Specification

The file of this unexamined application may be inspected and copies thereof may be purchased (849 O.G. 1221, Apr. 9, 1968).

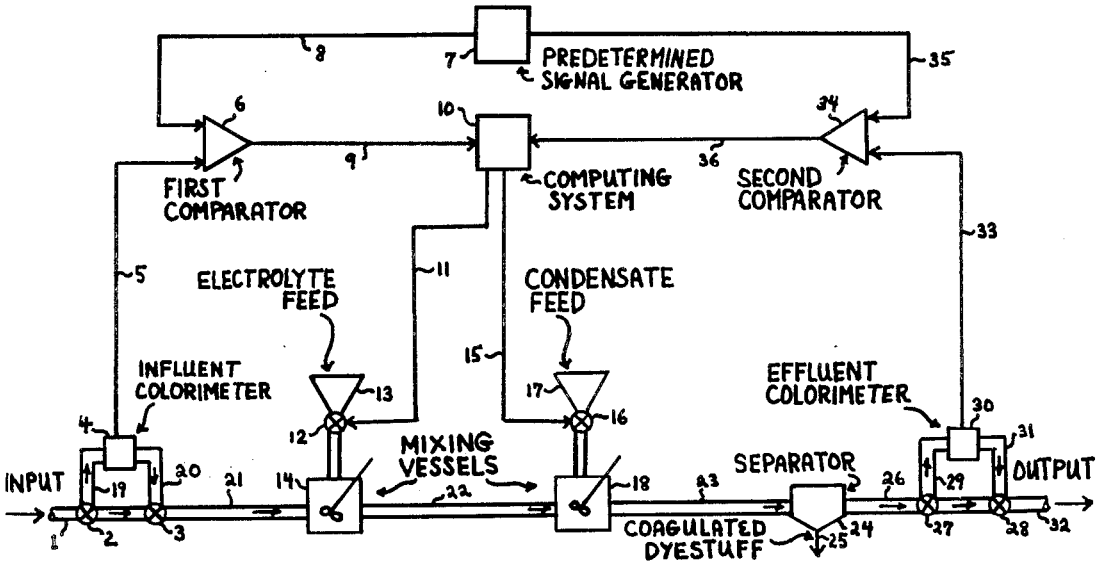

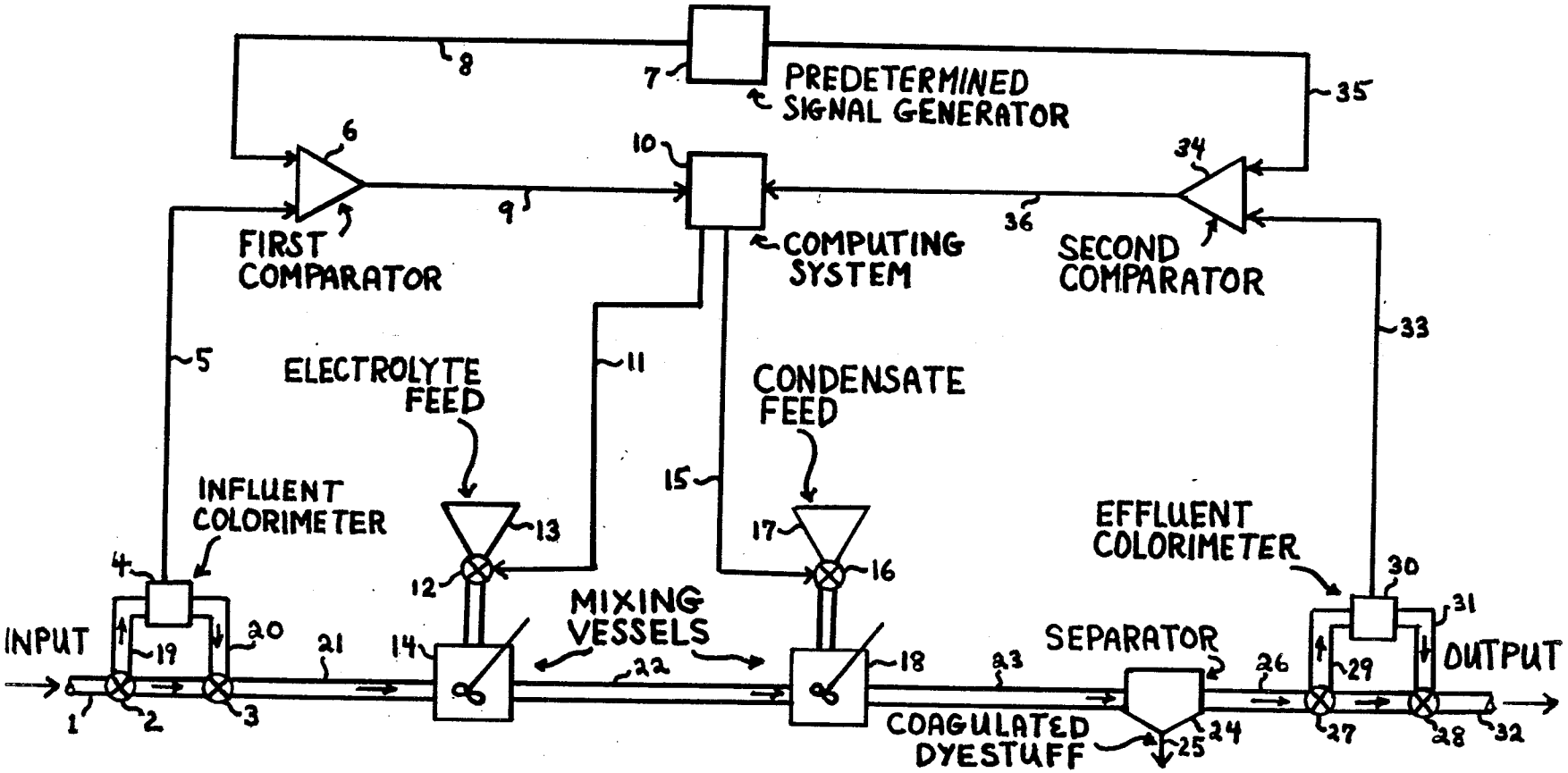
PREDETERMINED SIGNAL GENERATOR
SECOND COMPARATOR
COMPUTING SYSTEM
FIRST COMPARATOR
CONDENSATE FEED
ELECTROLYTE FEED
EFFLUENT COLORIMETER
INFLUENT COLORIMETER
SEPARATOR
MIXING VESSELS
COAGULATED DYESTUFF
OUTPUT
INPUT